United States Patent
Hess et al.

[15] 3,656,422
[45] Apr. 18, 1972

| | | | |
|---|---|---|---|
| [54] | DRIVING MECHANISM FOR COMPONENTS OF OPTICAL SYSTEM | 1,612,860 | 1/1927 Fairchild..................95/12.5 |
| [72] | Inventors: Karl-Günter Hess, Waldlaubersheim; Paul Himmelsbach; Otto Thomas, both of Bad Kreuznach, all of Germany | | *Primary Examiner*—John M. Horan *Attorney*—Karl F. Ross |
| [73] | Assignee: Jos. Schneider & Co. Optische Werke Kreuznach, Bad Kreuznach, Germany | | |
| [22] | Filed: Jan. 5, 1970 | | |
| [21] | Appl. No.: 602 | | |

[57] ABSTRACT

A television camera with two camming cylinders for the focusing of its objective and for the variation of its focal length (zoom effect) has two identical driving units removably attached to its housing, each unit including an electric motor in a prismatic casing with a motor shaft and an electric connector projecting from one end of the casing. Upon emplacement of the casing on the camera housing, the motor shaft engages a transmission shaft leading through a slipping clutch to the respective camming cylinder; at the same time an electric connection is established from the motor to zooming and focusing controls on the camera or on a remote panel.

[30] Foreign Application Priority Data

June 12, 1969 Germany..................P 19 29 759.7

[52] U.S. Cl...................................................95/45
[51] Int. Cl. ..................................................G03b 3/10
[58] Field of Search......................................95/44, 45

[56] References Cited
UNITED STATES PATENTS
2,720,817  10/1955  Mills........................95/45 X

9 Claims, 4 Drawing Figures

Karl-Günter Hess
Paul Himmelsbach
Otto Thomas
INVENTORS.

BY

Karl F. Ross
Attorney

DRIVING MECHANISM FOR COMPONENTS OF OPTICAL SYSTEM

Our present invention relates to an assembly for controlling the operation of an optical system, such as that of a photographic, cinematographic or television camera, to vary its focal length (zoom effect), to focus it, or to perform some other recurrent function such as the changing of front attachments or (in a projector) the feeding of slides.

It is known, e.g. from commonly owned U.S. Pat. No. 3,165,044 in the name of Paul Himmelsbach, to provide a reversible electric motor in a camera for the axial displacement of one or more objective components in response to closure of a manual switch on the camera housing. In the case of an 8-mm movie camera, for example, the motor may be energized by one or more batteries accommodated in the camera housing. With larger equipment, such as a television camera, the power supply may have to be separated from the drive unit and may include a portable battery pack or a cable to be plugged into a utility outlet.

Since the electric driving unit and its coupling with the movable actuating means of the optical system occasionally require inspection, repair or replacement, it is inconvenient to make this unit a fixed part of the enclosure for the optical system. If the driving unit is detachable, on the other hand, its connection to the power supply creates problems.

It is, therefore, the principal object of our present invention to provide an assembly of this general type wherein a detachable driving unit, upon being emplaced on an objective housing, is instantly connected to its power supply (which may be mounted on the housing or separate therefrom) and is simultaneously coupled with the actuating means inside the housing, such as a rotatable cam for the axial displacement of a lens member.

A more specific object is to provide an assembly of this type wherein two related but independent operations, such as focusing and zooming, are carried out by two identical and interchangeable driving units whereby, upon failure of one unit, the other may be used to perform the more essential operation (e.g. focusing) and whereby, furthermore, an identical standby unit may be used as a replacement for either of the two operating units.

These objects are realized, pursuant to our present invention, by the provision of at least one and preferably two detachable drive units each with a preferably prismatic casing containing an electric motor whose output shaft projects from the casing, preferably at an end face of the prism, the energizing circuit for the motor including a pair of mating electrical connectors on the casing and on the objective housing, such as a plug and a jack, interfitting upon emplacement of the casing on the objective housing. Such emplacement, moreover, operatively couples the output shaft of the motor with a confronting input shaft on the housing, the latter shaft being linked with the controlled actuating means (e.g. a camming cylinder) through suitable transmission means advantageously including a slipping clutch. Owing to the presence of such a clutch, the motor can remain energized for rotation in one sense even after the displaceable objective component or other load has arrived in a limiting position at one end of its range, a subsequent reversal of the sense of rotation then displacing the load in the opposite direction until the other end of the range is reached. In this way, proper correlation between the movement of the load and the operation of a reversing switch on a control panel remote from the housing, or on the housing itself, can be achieved regardless of the original load position of the controlled element upon the coupling of its input shaft with the motor shaft of the associated driving unit.

In an advantageous embodiment, therefore, one of the two coacting shafts—preferably the motor shaft—can be axially shiftable and resiliently biased to snap into an entrainment position, with interengagement of mating formations such as a rib and a slot on the confronting shaft ends, upon attainment of a predetermined relative angular position of the two shafts.

The driving unit may also include sensing means for signaling the instant position of the controlled load and/or its rate of displacement to an indicator on the control panel or the housing. The data thus transmitted may be used at the control station, for example, to effect automatic reversal of a zoom drive upon arrival in either limiting position, as is well known per se.

The above and other features of our invention will be described in greater detail hereinafter with reference to the accompanying drawing in which.

Figures 1, 2:
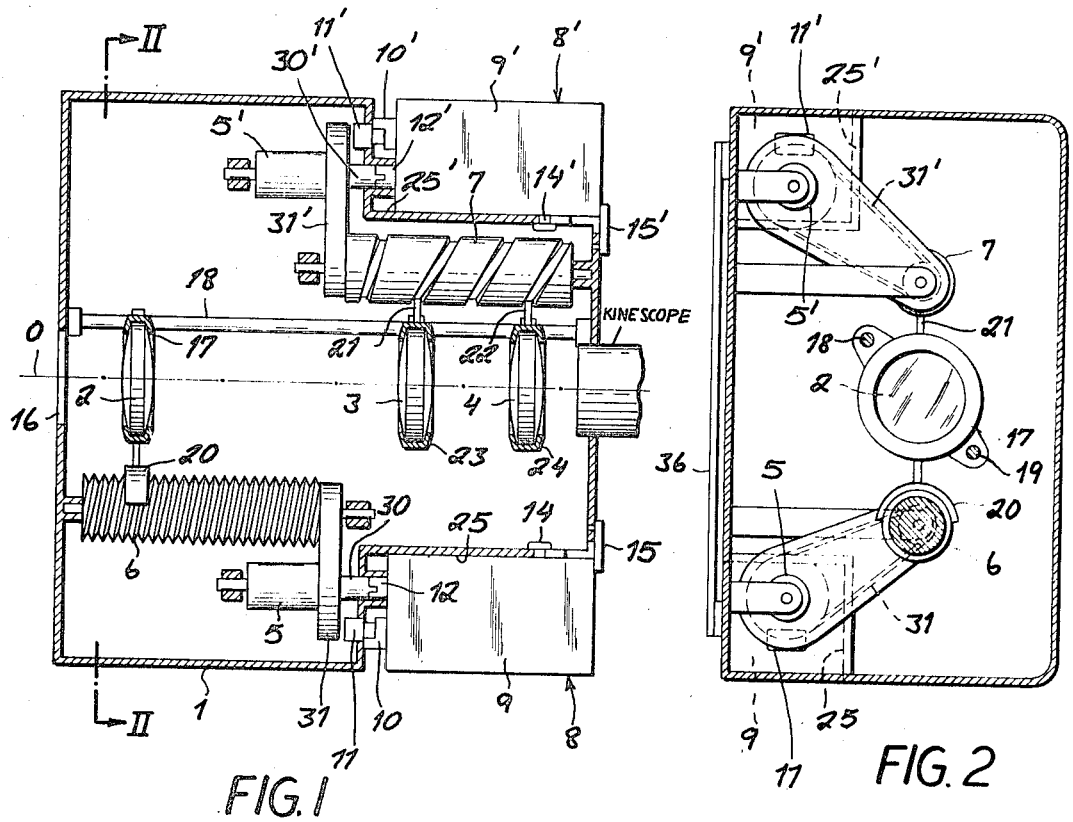
FIG. 1 is a somewhat diagrammatic illustration of a varifocal objective of a television camera equipped with a pair of detachable driving units according to our invention.
FIG. 2 is a cross-sectional view taken on the line II—II of FIG. 1.
Figure 4:
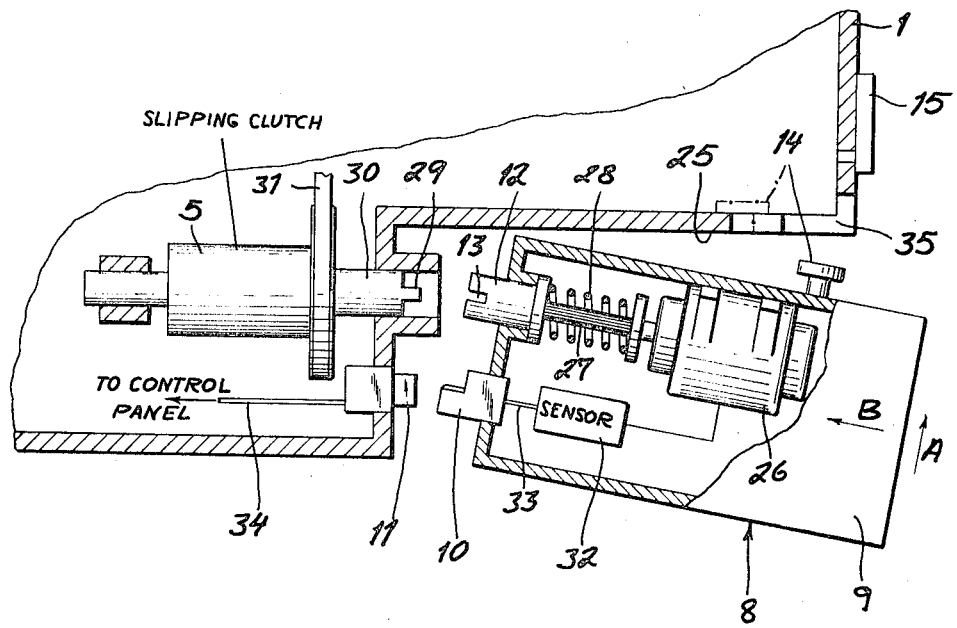
FIG. 4 is a fragmentary sectional view of part of the assembly of FIGS. 1 and 2 with a driving unit thereof in the process of emplacement.

In FIGS. 1 and 2 we have diagrammatically shown a camera housing 1 also partly illustrated in FIG. 4. Housing 1 has a front opening 16 in line with the optical axis 0 here shown to comprise three axially movable lens members 2, 3 and 4 (together with other components not illustrated). Front lens 2, held in a mount 17 which is slidable on a pair of parallel rods 18, 19, is controlled by a camming cylinder 6 with a helical groove engaging a follower 20 secured to lens mount 17. Another camming cylinder 7 has a helicoidal groove engaging followers 21, 22 rigid with similarly guided lens mounts 23, 24 of lenses 3 and 4, respectively, to impart differential motion to these two lenses.

Figure 3:
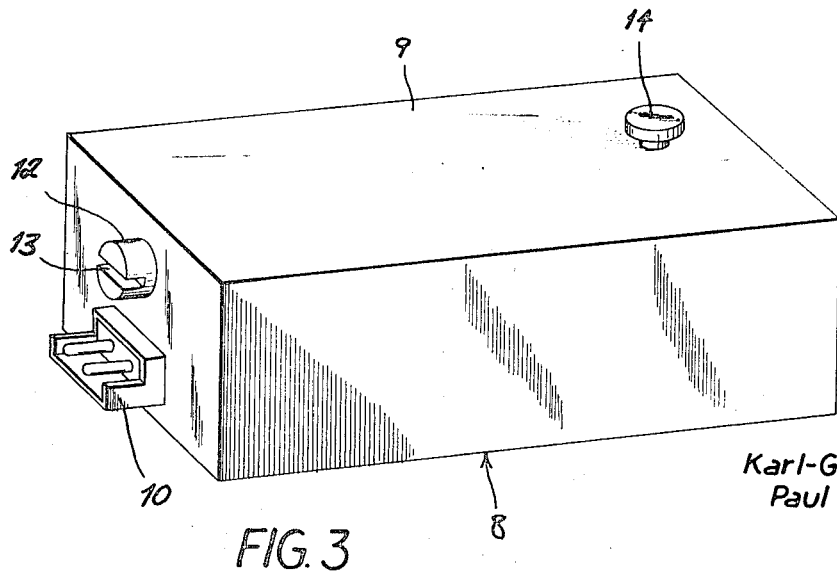
FIG. 3 is an isometric view of a driving unit forming part of the assembly of FIGS. 1 and 2.

The housing 1 is formed at its rear with a pair of sockets 25, 25' accommodating respective driving units 8, 8' with prismatic casings 9, 9'. The two driving units are identical and, as illustrated in FIGS. 3 and 4 for unit 8, comprise each a reversible electric motor 26 with a shaft 27 onto which an output shaft 12 is slidably splined under outward axial pressure from a spring 28. The free end of shaft 12, projecting from casing 8, has a transverse slot 13 to receive a complementary rib 29 on the confronting end of an input shaft 30 of a transmission serving to couple the cylinder 6 with motor 26 for entrainment thereby; this transmission further includes a slipping clutch 5 on shaft 30 and a belt drive 31 leading from the driven element of that clutch to the cylinder shaft. Corresponding elements forming part of unit 8' or associated therewith have been designated by the same reference numerals supplemented by prime marks. Casing 9 further contains a sensor 32 connected to the energizing circuit of motor 26, this circuit including a cable 33 which terminates at a plug 10 projecting from one of the end faces of the casing next to shaft 12. Plug 10 mates with a jack 11 on housing 1 whence an extension cable 34 leads to a control panel not shown.

Housing 1 is formed, along one of the rectangular surfaces defining the prismatic socket 25, with a slot 35 adapted to receive a bayonet lug 14 on casing 9 whereby the casing may be emplaced in its socket by transverse and longitudinal motion (arrows A and B in FIG. 4) to introduce the lug 14 into slot 35 while engaging plug 10 and shaft 12 with jack 11 and shaft 30, respectively. The anchoring of the casing 9 to housing 1 may be secured by a latch 15 swung out to overhang the rear face of the casing as shown in FIG. 1.

In most instances, the slot 13 will not be precisely aligned with the rib 29 upon the emplacement of unit 8. In such a case, the shaft 12 is repressed by the shaft 30 against the force of spring 28 until, upon the ensuing rotation of shaft 27 by motor 26, the formations 13 and 29 register with each other whereupon shaft 12 advances toward shaft 30 to complete the driving connection. In this position of interengagement, the lens 2 may find itself anywhere within its range of displacement; upon a certain amount of rotation of cylinder 6, the lens will come to rest against an abutment defining one of the limits of its stroke so that the clutch 5 will slip as the shaft 30 continues to turn. This condition may be reported to the control panel by the sensor 32 responding, for example, to the increase in current drawn by the motor in working against the drag of the clutch. At the control panel, therefore, a lamp may light and/or a switch connecting the cable 34 to its power source may be tripped for the manual or automatic reversal of the operation of motor 26. At the opposite end of the range, another reversal may take place in like manner, the lens 2 thus reciprocating until the motor circuit is broken. A visual indicator, not shown, may be provided on the casing 9 or on the control panel to displace a needle across a scale in step with the load represented by lens 2, as by actuating a relay upon each current reversal to complete an integrating circuit for the progressive energization of a deflecting coil or the like to move the needle in one or the other direction at a rate commensurate with motor speed. Naturally, a position indicator mechanically coupled with lens mount 17 or with camming cylinder 6 could be provided within housing 1 and could be viewed through a window as is well known per se.

Even though the two units 8 and 8' are identical, their motors may be operated at different speeds by means of suitably proportioned impedance networks included in their respective energizing circuits at the control panel. Thus, it will be immaterial whether these units are inserted so that unit 8 drives the cylinder 6 while unit 8' drives the cylinder 7, as illustrated, or whether they are interchanged. By the same token, any standby unit of like construction may be substituted for either of these two units.

As illustrated in FIG. 2, a rigid strap 36 may be detachably secured to these units to interconnect them for joint emplacement and removal. Upon removal of these units, the exposed ends of input shafts 30 and 30' could be coupled to conventional manual or automatic drives remote from housing 1, e.g. with the aid of flexible shafts.

In the case of smaller cameras, the power supply for the drive motor 26 could also be disposed (in the form of one or more batteries) within the casing 9 or 9'.

We claim:

1. An assembly for controlling the operation of an optical system including movable actuating means with a limited range of displacement in an objective housing, comprising:
    a casing detachably secured to said housing;
    an input shaft in said housing confronting said casing;
    a reversible electric motor in said casing provided with an output shaft engaging said input shaft for entrainment thereof upon emplacement of said casing on said housing;
    transmission means in said housing linking said input shaft with said actuating means;
    complementary electric connectors on said housing and on said casing coacting to establish an energizing circuit for said motor upon emplacement of said casing, said energizing circuit including control means for said motor remote from said casing; and
    sensing means in said energizing circuit responsive to a change in motor current for signaling to said control means the arrival of said actuating means at a limit of said range of displacement.

2. An assembly as defined in claim 1 wherein said transmission means includes a slipping clutch.

3. An assembly as defined in claim 1 wherein said input and output shafts have confronting ends provided with mating formations interengageable in a predetermined relative angular position thereof, one of said shafts being axially shiftable and resiliently biased toward the other shaft for effecting interengagement of said formations in said relative angular position.

4. An assembly as defined in claim 3 wherein the axially shiftable shaft is said output shaft.

5. An assembly as defined in claim 1, further comprising latch means on said housing for releasably locking said casing in position thereon.

6. In a camera, in combination:
    a housing provided with a front opening;
    an optical objective in said housing having an axis aligned with said front opening, said objective including at least two independently axially shiftable components;
    a pair of rotatable camming elements in said housing each operatively linked with one of said components for axially shifting same;
    a pair of input shafts in said housing;
    transmission means including a pair of slipping clutches respectively coupling said input shafts with said camming elements;
    a pair of driving units for said camming elements, each of said driving units comprising a casing, a reversible electric motor in said casing having an output shaft detachably connected with the respective input shaft for entraining same, and an energizing circuit for said motor including mating connectors on said housing and on said casing, the latter being removably secured to said housing; and
    control means connected to said energizing circuit for selectively actuating the respective camming element.

7. The combination defined in claim 6 wherein said driving units are identical and interchangeably positioned on said housing.

8. The combination defined in claim 6 wherein said housing is provided with a pair of external sockets remote from said front opening respectively receiving the casings of said driving units, said casings being of prismatic shape complementary to that of said sockets and having their output shafts projecting from an end face of the prism.

9. The combination defined in claim 6 wherein said driving units are provided with strap means detachably interconnecting their casings.

* * * * *